United States Patent
Mishra et al.

(10) Patent No.: US 11,356,859 B2
(45) Date of Patent: Jun. 7, 2022

(54) 5G NATIVE ARCHITECTURE

(71) Applicant: Parallel Wireless, Inc., Nashua, NH (US)

(72) Inventors: Rajesh Kumar Mishra, Westford, MA (US); Eugina Jordan, Leominster, MA (US); Zahid Ghadialy, Ilford (GB)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 16/788,304

(22) Filed: Feb. 11, 2020

(65) Prior Publication Data

US 2020/0260296 A1     Aug. 13, 2020

Related U.S. Application Data

(60) Provisional application No. 62/804,209, filed on Feb. 11, 2019.

(51) Int. Cl.
| | | |
|---|---|---|
| *H04W 16/24* | (2009.01) | |
| *H04W 16/18* | (2009.01) | |
| *H04W 84/04* | (2009.01) | |

(52) U.S. Cl.
CPC .......... *H04W 16/24* (2013.01); *H04W 16/18* (2013.01); *H04W 84/042* (2013.01)

(58) Field of Classification Search
CPC .... H04W 16/24; H04W 16/18; H04W 84/042
USPC ....... 455/422.1, 403, 424, 426.1, 418, 414.1
See application file for complete search history.

(56) References Cited

U.S. PATENT DOCUMENTS

| | | | |
|---|---|---|---|
| 9,588,815 B1* | 3/2017 | Mistry | G06F 11/3452 |
| 10,367,677 B2 | 7/2019 | Parkvall et al. | |
| 10,630,410 B2 | 4/2020 | Parkvall et al. | |
| 2015/0109995 A1 | 4/2015 | Mathai et al. | |
| 2016/0156503 A1* | 6/2016 | Rosa de Sousa Teixeira | H04L 41/0668 370/216 |
| 2016/0381146 A1* | 12/2016 | Zhang | H04L 67/303 709/228 |
| 2017/0251385 A1* | 8/2017 | Fox | H04L 41/5035 |

FOREIGN PATENT DOCUMENTS

WO     2017171647 A1     10/2017

OTHER PUBLICATIONS

Gabriel Brown, "Service-Based Architecture for 5G Core Networks", Heavy Reading, White Paper, Nov. 2017.

* cited by examiner

*Primary Examiner* — Nghi H Ly
(74) *Attorney, Agent, or Firm* — Michael Y. Saji; David W. Rouille (57)     ABSTRACT

Systems, methods and computer software are disclosed for providing a 5G native architecture. In one embodiment a method includes providing an all G software platform, including a core virtualization stack capable of communication with all hauls, and a radio virtualization stack capable of communication with all cores; and wherein the core virtualization stack communicates with an analytics layer, the analytics layer communicates with an orchestration layer, the orchestration layer communicates with a consolidation layer, and the consolidation layer communicates with the radio virtualization stack such that any G core is able to communicate with any G radio access network.

20 Claims, 10 Drawing Sheets

5G NATIVE ARCHITECTURE

CROSS-REFERENCE TO RELATED APPLICATIONS

This application claims priority under 35 U.S.C. § 119(e) to U.S. Provisional Pat. App. No. 62/804,209, filed Feb. 11, 2019, titled "5G Native Architecture" which is hereby incorporated by reference in its entirety for all purposes. This application hereby incorporates by reference, for all purposes, each of the following U.S. Patent Application Publications in their entirety: US20170013513A1; US20170026845A1; US20170055186A1; US20170070436A1; US20170077979A1; US20170019375A1; US20170111482A1; US20170048710A1; US20170127409A1; US20170064621A1; US20170202006A1; US20170238278A1; US20170171828A1; US20170181119A1; US20170273134A1; US20170272330A1; US20170208560A1; US20170288813A1; US20170295510A1; US20170303163A1; and US20170257133A1. This application also hereby incorporates by reference U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 12, 2013; U.S. Pat. No. 8,867,418, "Methods of Incorporating an Ad Hoc Cellular Network Into a Fixed Cellular Network," filed Feb. 18, 2014; U.S. patent application Ser. No. 14/034,915, "Dynamic Multi-Access Wireless Network Virtualization," filed Sep. 24, 2013; U.S. patent application Ser. No. 14/289,821, "Method of Connecting Security Gateway to Mesh Network," filed May 29, 2014; U.S. patent application Ser. No. 14/500,989, "Adjusting Transmit Power Across a Network," filed Sep. 29, 2014; U.S. patent application Ser. No. 14/506,587, "Multicast and Broadcast Services Over a Mesh Network," filed Oct. 3, 2014; U.S. patent application Ser. No. 14/510,074, "Parameter Optimization and Event Prediction Based on Cell Heuristics," filed Oct. 8, 2014, U.S. patent application Ser. No. 14/642,544, "Federated X2 Gateway," filed Mar. 9, 2015, and U.S. patent application Ser. No. 14/936,267, "Self-Calibrating and Self-Adjusting Network," filed Nov. 9, 2015; U.S. patent application Ser. No. 15/607,425, "End-to-End Prioritization for Mobile Base Station," filed May 26, 2017; U.S. patent application Ser. No. 15/803,737, "Traffic Shaping and End-to-End Prioritization," filed Nov. 27, 2017, each in its entirety for all purposes. This document also hereby incorporates by reference U.S. Pat. Nos. 9,107,092, 8,867,418, and 9,232,547 in their entirety. This document also hereby incorporates by reference U.S. patent application Ser. No. 14/822,839, U.S. patent application Ser. No. 15/828,427, U.S. Pat. App. Pub. Nos. US20170273134A1, US20170127409A1, US20180049275A1, U.S. Provisional App. Nos. 62/746,546 and 62/676,906 in their entirety.

BACKGROUND

Today, 5G is primarily concerned with radio access network (RAN) technology, as 3GPP specifications for the rest of the network are yet to be completed. Being the first to market with 5G is therefore reliant on how quickly and cost-effectively operators can introduce 5G radios into their networks and integrate them with legacy 2G, 3G and 4G infrastructure.

In order to roll out 5G, the economics of the mobile industry have to change. This is because the current layered approach of adding a new generation of mobile technology on top of the existing generation, and then having to maintain them all as silos, is not cost-effective. In its latest earning report, Verizon said that they will increase capital spend on 5G by over $1 Billion this year. But, like many other operators, they will need to find this capital through efficiencies in their 4G network.

In 4G, a UE (user equipment) or other mobile device that attaches to a nearby cell will obtain a primary sync signal and a secondary sync signal from the cell, which together enable the UE to calculate a physical cell identity (PCI). There are 504 different combinations available for the PCI, based on characteristics of the primary and secondary sync signals. A mobile network may include more than 504 cells, but this is typically handled by ensuring that the same PCI is not used for adjacent cells.

The importance of disaggregating hardware and software to make networks open, easy and cost effective to deploy and maintain is desired. The necessity of software-based network solutions being able to support ALL Gs (2G/3G/4G/5G) is also desired. Systems and methods are disclosed herein that address these problems. As well, operators are in need of the ability to deploy and maintain any and all generations of mobile networks in a unified, simplified, and cost-effective way.

SUMMARY

A 5G native architecture is described. Parallel Wireless's ALL-G unified Software Platform brings 5G native architecture to the service providers deploying current (4G) and legacy (2G/3G) technologies or modernizing their networks. This software platform enables any 5G migration option and is software upgradable to any future 3GPP releases. As a result, 5G-like features, including low latency and network slicing, can be delivered today to 2G, 3G and 4G networks. The architecture also allows complete RAN virtualization capability to decouple RF from baseband processing resources to support any DU/CU splits to deliver the most advanced and cost-effective solution today.

In one embodiment, a method is disclosed for providing a 5G native architecture in a cellular network, comprising: providing an all G software platform located at a coordination node between at least one radio access network (RAN) and at least one core network, including a core virtualization stack capable of communication with all hauls, and a radio virtualization stack capable of communication with all cores; The core virtualization stack communicates with an analytics layer, the analytics layer communicates with an orchestration layer, the orchestration layer communicates with a consolidation layer, and the consolidation layer communicates with the radio virtualization stack such that any G core may be able to communicate with any G radio access network.

The orchestration layer may include a software configuration module and a software optimization module. The consolidation layer may include at least two of: a vBSC software module, a vRNC software module, an HNB-GW software module, an HeNB-GW software module, an X2-GW software module, a vENB software module, a vEBC software module, 5gc software module, a TWAG software module, and an ePDG software module. The method may further comprise providing, via the all G software platform, 5G standalone (SA) service.

The method may further comprise providing the 5G SA service via one of: SA LTE connected to EPC, SA NR connected to 5GC, and SA LTE connected to 5GC. providing, via the all G software platform, 5G non-standalone (NSA) service. The method may further comprise providing the 5G NSA service via one of: NSA LTE assisted NR connected to EPC, NSA NR assisted LTE connected to 5GC, and NSA LTE assisted NR connected to 5GC. The all G software platform may provide network slicing across all Gs and across the cellular network as a whole.

In another embodiment, a system is disclosed for providing a 5G native architecture, comprising: an all G software platform, including a core virtualization stack capable of communication with all hauls, and a radio virtualization stack capable of communication with all cores and The core virtualization stack communicates with an analytics layer, the analytics layer communicates with an orchestration layer, the orchestration layer communicates with a consolidation layer, and the consolidation layer communicates with the radio virtualization stack such that any G core may be able to communicate with any G radio access network.

The orchestration layer incldues a software configuration module and a software optimization module. The consolidation layer may include at least two of: a vBSC software module, a vRNC software module, an HNB-GW software module, an HeNB-GW software module, an X2-GW software module, a vENB software module, a vEBC software module, 5gc software module, a TWAG software module, and an ePDG software module. The all G software platform may provide 5G standalone (SA) service. The 5G SA service comprises one of SA LTE connected to EPC, SA NR connected to 5GC, and SA LTE connected to 5GC.

The method may further comprise the all G software platform providing 5G non-standalone (NSA) service. The 5G NSA service comprises one of: NSA LTE assisted NR connected to EPC, NSA NR assisted LTE connected to 5GC, and NSA LTE assisted NR connected to 5GC. The all G software platform may provide network slicing across all Gs and across the whole network.

In another embodiment, a non-transitory computer-readable medium is disclosed containing instructions for providing an all G software platform which, when executed, cause a system to perform steps comprising: providing an all G software platform, including a core virtualization stack capable of communication with all hauls, and a radio virtualization stack capable of communication with all cores; and The core virtualization stack communicates with an analytics layer, the analytics layer communicates with an orchestration layer, the orchestration layer communicates with a consolidation layer, and the consolidation layer communicates with the radio virtualization stack such that any G core may be able to communicate with any G radio access network.

The all G software platform may provide 5G standalone (SA) service. The all G software platform may provide 5G non-standalone (NSA) service. The all G software platform may provide network slicing across all Gs and across an entire cellular network.

DETAILED DESCRIPTION

Parallel Wireless has all the 'Gs' covered' in our unified software platform, giving operators the ability to deploy and maintain any and all generations of mobile networks in a unified, simplified, and cost-effective way. As well, Parallel Wireless virtualizes, automates and optimizes ALL G cellular net-works, delivering quality end user experiences for all use cases: low density/high density, IBS or public safety LTE. Our solution provides agility across COTS-based physical/virtual telco networks by unifying ALL Gs, integrating abstraction, and real time orchestration with network automation enabled by the Parallel Wireless software platform to empower global SPs to be profitable despite margin pressure.

The biggest expense for mobile operators has always been the RAN, accounting for around sixty percent of CAPEX and sixty-five percent of OPEX. Carriers are under pressure to demonstrate a return on CAPEX-heavy operations. Since the introduction of digital mobile communications in the early 90s, the migration to the next generation (from 2G to 3G, and from 3G to 4G) required a complete radio access network (RAN) replacement. All legacy RAN components (BTS and BSC for 2G, NodeB and RNC for 3G and eNodeBs for 4G) were G-specific, meaning software and hard-ware were not disaggregated. With 5G coming down the line, the MNOs need to maximize as much value as possible from existing network assets before giving the green light to new investment. Fiscally mind-ed operators are looking to keep running costs down, maintain levels of service across all standards, from 2G to 4G, but also invest in projects that will cre-ate new value. To date, most operators have focused their efforts on virtualizing the 4G only network, but there is a requirement to open and virtualize 2G, 3G, 4G and apply software that can be automatically re-configured to support a variety of radio access technologies, as well as potentially 5G in the future.

The software-based approach for older Gs is unheard of where, by virtue of the original design, it's impossible to reconfigure legacy 2G and 3G networks to support newer communications standards such as 4G, and eventually 5G. The Open Compute model is now disrupting the telecoms space and mobile operators are moving away from proprietary hardware to a virtualized network architecture.

The Parallel Wireless solution for indoor coverage is a 3GPP standards-based solution that is easily scalable to suit any size enterprise. The solution enables service providers to deploy reliable in-building coverage at pennies per square foot while at the same time reducing the complexity of deployment and maintenance.

The solution is based on the cellular access point (CAP)/enterprise femtocell built using industry-standard general purpose processors (GPPs), and integrates 3G and 4G/LTE with real-time network orchestration, flexible scheduling, interference mitigation, resource optimization, traffic prioritization and enterprise-grade security. Orchestration with real-time network SON, resource optimization, and traffic mitigation on HetNet Gateway (HNG) software, enables seamless mobility for users indoors and out and makes network deployments fast and simple with no RF planning or complex system integration required.

Operators need technology that will maximize the value of their existing network assets and give them the capital for a cost-effective migration to 5G. Therefore, the inventors have conceived and contemplated the benefits of a solution (software and RAN hardware) that is software upgradable to add additional capability subsequent to purchase, including addition of 2G, 3G, 4G, Wi-Fi, and even 5G.

In some embodiments, a novel base station is described that is software upgradable to any G, including 5G new radio (NR), by virtue of its virtualized software, coordinating architecture using the HetNet Gateway, and industry-standard general purpose processors (GPPs). Software can be downloaded to the base station and the existing radio can be reused within its physical limits to provide additional G support not available at the factory. Its capacity can be also increased with a COTS BBU, which can provide external processing to supplement processing capacity at the CWS. The ALL G Software Platform from Parallel Wireless offers a 5G native unified architecture for 2G, 3G, 4G, 5G, and Wi-Fi. The future-proofed virtualized operating system and architecture supports 5G and beyond, providing the ability to extend investments. The only limitation on this software upgradeability is the use of appropriate radio hardware for the radio access technology (RAT), which can be plugged into the CWS using industry standard RF connectors and cables. For example, a Massive MIMO antenna and filter can be plugged in to provide high-bandwidth 5G radio support. Flexibility of the architecture allows SPs ease of migration from any previous G at their own pace and convenience.

In the Parallel Wireless unified architecture, the base station is treated as a multi-RAT node, so that when it is upgraded, it simply recognizes that a new RAT has come online, and its coordinating server (HNG) similarly is able to understand that the new RAT is available for use. The coordinating server handles all configuration of the new RAT, especially simple after the initial configuration of the system with the address and credentials of the coordinating server.

In some embodiments, the Parallel Wireless unified architecture also incorporates a unique feature, the Parallel Wireless ALL G software platform at the coordinating server (HNG). This coordinating server is used to manage all base stations, including multi-RAT and software-upgradeable any G base stations, but also including third-party base stations of any RAT. This coordinating server is also used to manage the core networks that these base stations are connected to. By abstracting out the base stations and also abstracting the core networks, the Parallel Wireless ALL G software platform is able to handle any RAT at the RAN, even when coupled with any backhaul and any core network. Additionally, configuration and optimization are performed across all Gs.

Figure 1:
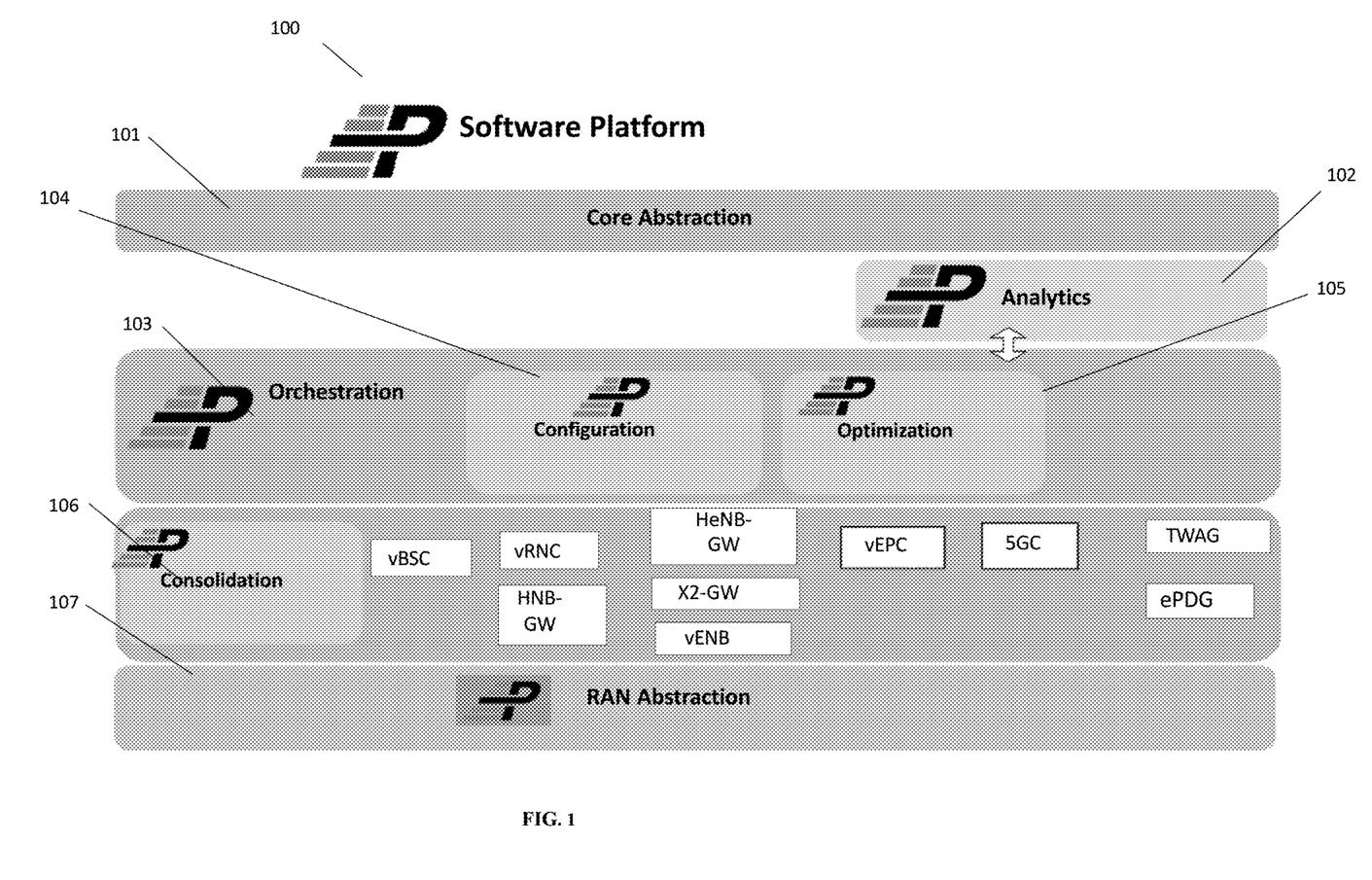
FIG. 1 is a block diagram showing components of an ALL G software platform, in accordance with some embodiments.
Figure 2:
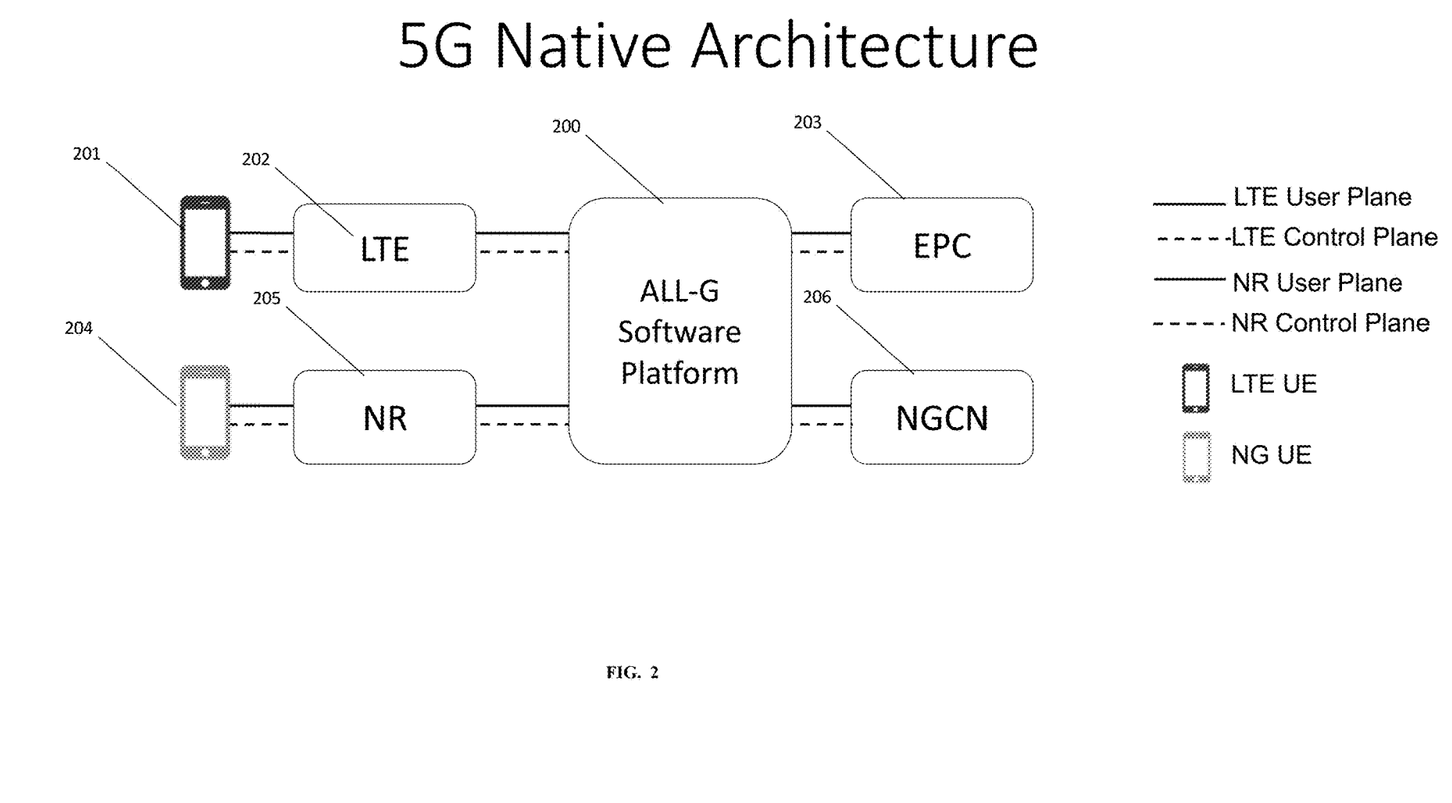
FIG. 2 is a block diagram showing a 5G native architecture, in accordance with some embodiments.

Referring to FIG. 1, an ALL G software platform 100 is shown. Platform 100 is running at a location in the network between the RAN and the core network, as shown in FIG. 2, and includes a core abstraction 101 layer, an analytics module 102, an orchestration module 103 including at least one optimization module 104 and a configuration module 105, a consolidation layer 106, and a RAN abstraction module 107. More configuration modules and optimization modules can be provided to provide services for the different Gs. The consolidation layer 106 includes various different virtual network functions. By providing virtual network functions at the Parallel Wireless ALL G software platform, any base station with any G can be managed by the virtual network functions and not by the core network, thereby enabling effective RAN abstraction and core abstraction. For example, a virtual BSC handles 2G, a virtual RNC and Home nodeB gateway handle 3G, a home eNodeB gateway, X2 gateway, and virtual eNodeB, and if needed a virtual EPC, handle 4G/LTE, a virtual 5G core handles 5G, and a TWAG/ePDG handle Wi-Fi, in each case interworking the data from their connected base stations and UEs to be able to connect to whatever core networks are handled by the core abstraction layer 101. This unification of 2G/3G/4G RAN functionality (vBSC, vRNC, X2 gateway) under the same software umbrella coupled with orchestration capabilities enable programmable and automated RAN for savings on deployment and maintenance and will result in the best network performance for optimal subscriber experience.

By virtualizing the 5G RAN, and also all other RANs, service providers can now reduce the cost of all generations of deployments, from 2G to 5G. They can then deliver 5G coverage by making deployments easy and affordable to install and maintain, while sustaining a high quality of service for customers. Software based network architecture enables operators to utilize benefits of advanced 5G RANs without deploying the 5G core. The inventors have understood and recognized, however, that at the same time, 5G-like features (i.e. lower latency, e2e slicing, etc.) can be provided for all Gs.

For example, 5G is designed to have lower latency as one of its design goals, and consequently a 5G NR plus 5GCN will provide lower latency. This lower latency is achieved partially by changing the transmit time interval (TTI)/RRC from 10 ms to 1 ms, directly reducing latency as part of the 5G radio standard; since 4G has a TTI of 10 ms, single-digit latency is not achievable. However, today's 4G networks have approximately 40 ms of latency. If the bottom limit of latency in 4G is 10 ms due to RRC, the remaining 30 ms, which may be from backhaul and non-optimized remote PGW, can be eliminated using the 5GCN, which the Parallel Wireless 5G Native Architecture is positioned to do using its abstraction layer. Or, even without a 5GCN, much of the benefit of latency reduction is enabled by moving the packet gateway (PGW) closer to the edge of the network, i.e., local breakout. By bringing local breakout to 4G and all Gs, 75% of the latency gains of 5G are unlocked for all Gs. Similar capabilities are able to be unlocked for all Gs, for example by providing network slicing (see FIG. 4).

FIG. 2 shows the 5G native architecture at a gateway in the context of the whole cellular network. The All-G software platform 200 communicates with LTE 202 which communicates with an LTE UE 201. The ALL-G software platform 200 communicates with EPC 203. The All-G software platform 200 communicates with 5G new radio (NR) 205 which communicates with a 5G next generation (NG) UE 204. The ALL-G software platform 200 communicates with 5G next generation core network (NGCN) 206. The 5G-native architecture will facilitate easy migration from All Gs to 5G with standalone (SA) or non-standalone (NSA) interoperability. The 5G native architecture also provides 4G core investment extension and the flexibility to choose any migration option and timeline.

By supporting ALL Gs under the same software umbrella, Parallel Wireless delivers on the promises of real-time orchestration and network automation. Future proofing for ALL Gs is made possible by the white box and Open Compute movement, resulting in ALL G network unification and a radically lower cost structure that enables SP profitability and makes their networks ready for evolving subscriber needs.

Notably, the Parallel Wireless 5G native architecture supports any 5G Network Architecture Option by providing the service provider with flexibility to choose any upgrade path that fits with their strategy. Open network architecture allows integration and interoperability with any 3rd party New Radio (NR), Massive MIMO, or other radio/antenna vendor, thereby reducing risk and dependency on any vendor and vendor lock-in. An operator can deploy a 5G radio using a NSA core, and later upgrade to a SA core, without disrupting the RAN at all; more unusually, the operator can deploy 4G radios on a 5G NGCN only, or can use combinations like a 2G core plus a 5G core, or 3G core plus 5G core, that are not contemplated under the present standard.

Figure 3:
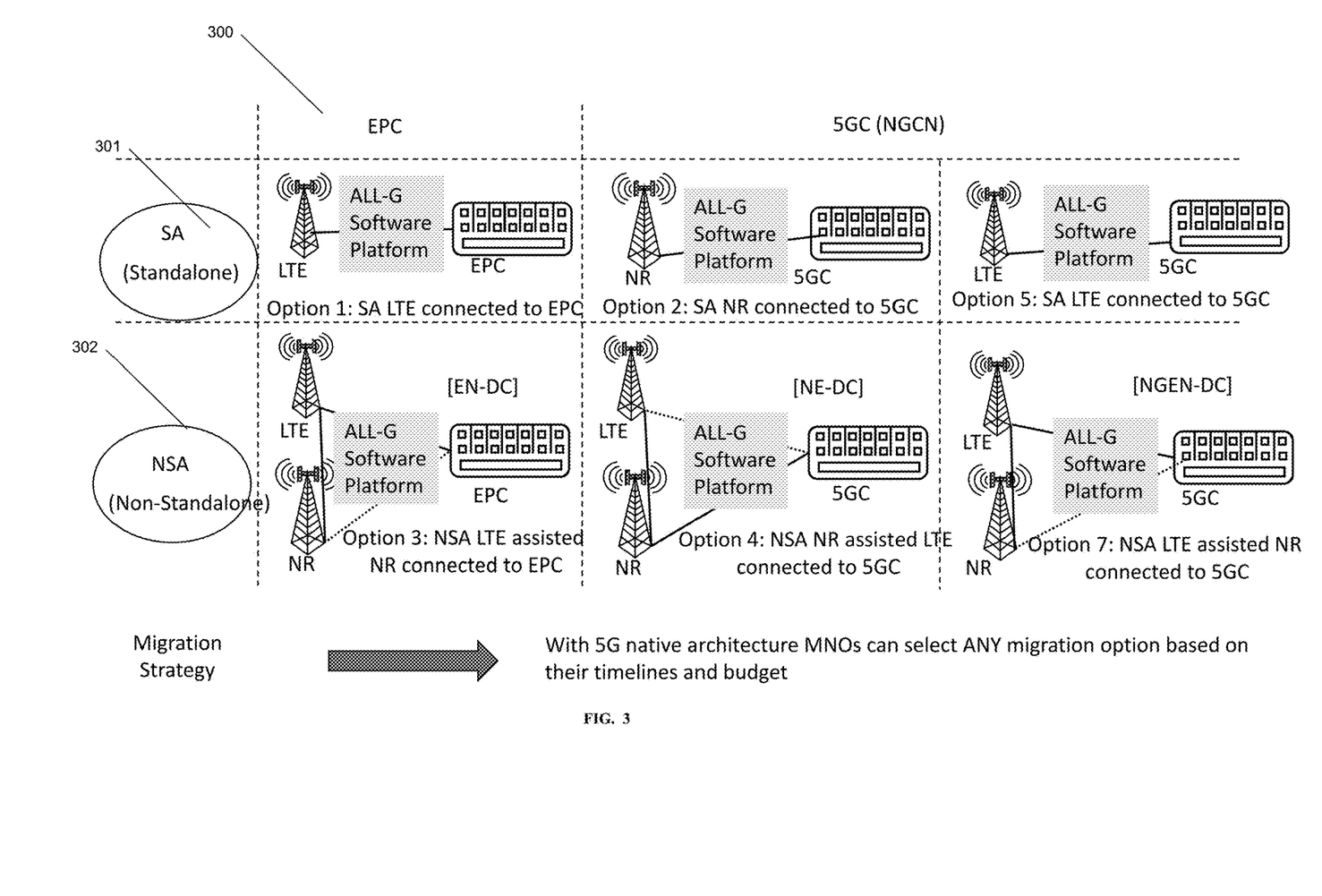
FIG. 3 is a diagram of a migration strategy with a 5G native architecture, in accordance with some embodiments.

FIG. 3 shows schematically this same flexible migration strategy with 5G native architecture 300. The migration strategy is provided with the 5G native architecture so that MNOs can select any migration option based on their timelines and budget. These include SA 301 to EPC or to 5GC (NGCN), as well as NSA 302 to EPC or to 5GC (NGCN). Being a 5G native platform, it will provide a smooth migration path to 5G utilizing any migration option.

5G native architecture supports any 5G Network Architecture Option by providing the SP with flexibility to choose any upgrade path that fits with their strategy. The use of an open network architecture allows integration and interoperability with any 3rd party New Radio (NR), Massive MIMO, or other radio/antenna vendor, thereby reducing risk and dependency on any vendor and vendor lock-in. By open network architecture, the inventors have contemplated the use of not only standards that are being developed for different radio splits and 4G/5G dual connectivity or non-standalone capability, but also the re-use of existing standards as de facto backwards compatibility, with a stateful ALL G radio abstraction and interoperability layer as described herein and above. Unlike specialized "Open RAN" technology that relies on the latest proprietary standards, Parallel Wireless's 2G/3G/4G/5G unified software platform enables true OPEN RAN through decoupling of hardware (e.g., radio, RAN, G) and software functionality.

This functional separation also enables the Unified Software Platform to support all the different protocol splits between distributed units (DUs) and centralized units (CUs) based on available backhaul/fronthaul options, e.g., Option 6, Option 7, Option 7.2, Option 8, etc. Different RAN element functionalities consolidate on the platform, reducing complexity and making overall network maintenance simpler and less resource intensive.

The Parallel Wireless Unified Software Platform also provides complete RAN orchestration, including self-configuration and self-optimization. All new radio units are self-configured by the software, reducing need for manual intervention. The self-optimization is responsible for necessary optimization related tasks across different RANs, utilizing available RAN data from the Analytics module. The predictive approach utilized by the Parallel Wireless platform, in contrast to the legacy reactive optimization approach, improves user experience and increases network resource utilization. Notably, the 5G standards have brought modern cloud-based service-oriented architectures to the cellular operator network, but only for 5G NGCN deployments. These advantages are not even available to 5G NSA deployments, much less to other Gs like 2G and 3G. However, due to the Parallel Wireless 5G Native Architecture, these service-oriented architectures are available to serve all of the RANs using the same RAN abstraction layer. 5G core network technologies can be made available for other Gs, including analytics-based predictive optimization, etc., and moreover, information from one RAT or one G is not siloed into a particular analytics database that is not capable of communicating with the 5GCN analytics system, enabling cross-G optimization strategies for increased customer satisfaction even when not on 5G.

Figure 4:
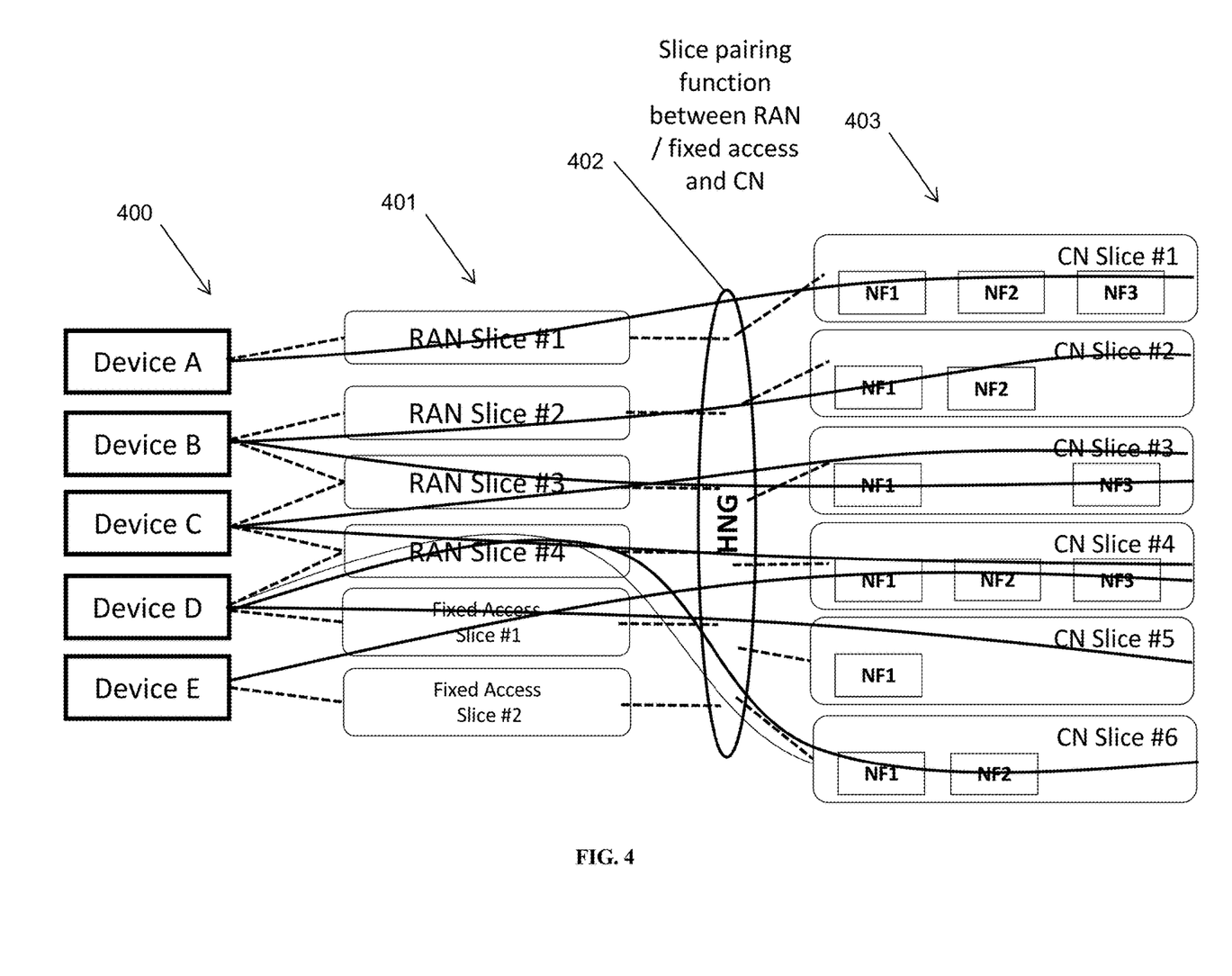
FIG. 4 is diagram showing network slicing across ALL Gs and across the whole network, in accordance with some embodiments.

FIG. 4 shows network slicing across All Gs and across the whole network. Devices 400 provide RAN slices 401 to one side of the HNG 402. CN slices 403 are shown on the other side of the HNG 402. Regular RAN slices 401 can be distinguished from fixed access RAN slices, e.g., slices with fixed, broadband-like subscriptions, in some embodiments. These RAN slices are then paired at the HNG (the Parallel Wireless ALL G software platform) 402 with core network slices 403. The HNG 402 is aware of both the individual needs of devices A, B, C, D, and E; and the available radio resources of RAN slices 1, 2, 3, 4, and fixed access slices 1 and 2; and the available core network network function resources at NF1, NF2, NF3, etc., and performs pairing of RAN slices and core slices to meet the needs of the RAN users wherever possible. In many ways this is similar to the 5G network slicing paradigm; however, in the Parallel Wireless ALL G network, slicing is available for any G, not just for 5G. For example, if Device C is using 2G, it may be given a 2G RAN slice and interworked to a 4G packet-based VoLTE connection, to more optimally use available 4G CN resources. Or, for example, if a 5G RAN slice is using a high level of bandwidth, and sufficient backhaul is available, multiple 4G packet data network core network slices can be combined to feed data to the 5G RAN slice. Or, for example, if fixed access slice #1 is no longer using its designated bandwidth, the RAN can give the available bandwidth to users of any G, from 2G to 3G to 4G to 5G, as radio antennas and technology permit.

The Parallel Wireless indoor solution is based on the HetNet Gateway (HNG) acting as the gateway between operators' core networks and the indoor radio access network based on associated Cellular Access Points (CAPs). From the core network's perspective HNG will act as a single eNodeB (E-UTRAN) or NodeB (UTRAN), reducing the number of signaling messages and overhead for core networks due to the large number of CAPs in small cell deployments. Unlike the DAS approach, this solution can scale easily with the support of HNG orchestration functionalities.

The Parallel Wireless Cellular Access Point is a low-cost, software-defined, multi-RAT (3G/4G) femtocell that provides 3G/4G coverage. The CAP is available in various modes, for example, 3G/UMTS, 4G/LTE, or 3G/UMTS and 4G/LTE. A flexible design approach helps to achieve the right level of deployment flexibility and attractive economics for Service Providers to deliver variants for a wide variety of Enterprise deployments with the lowest cost per unit and coverage, bringing overall CAPEX expenditures down with over 90% savings.

The Parallel Wireless HetNet Gateway (HNG) can also act as a cloud-based network orchestrator and gateway for enterprise, that logically sits between enterprise RAN and the Core. It may runs on any Intel COTS server, configures and optimizes the indoor network and manages Enterprise Femtos, including integration with macros, to provide a seamless user experience for voice and data. The initial install will require very little RF planning or complex system integration and can be done in under a day. As a result, indoor coverage can be provided at a much lower cost, making it as easy and as cost-effective as enterprise Wi-Fi. HetNet Gateway also enables network sharing, private LTE, and several voice services such as VoLTE and low-cost VoWiFi. As all services are anchored on HNG, handoff between voice services is made seamless so there are less dropped calls. HNG also enables seamless handoff between different macro networks so users' calls will not drop once they leave the building.

Figure 5:
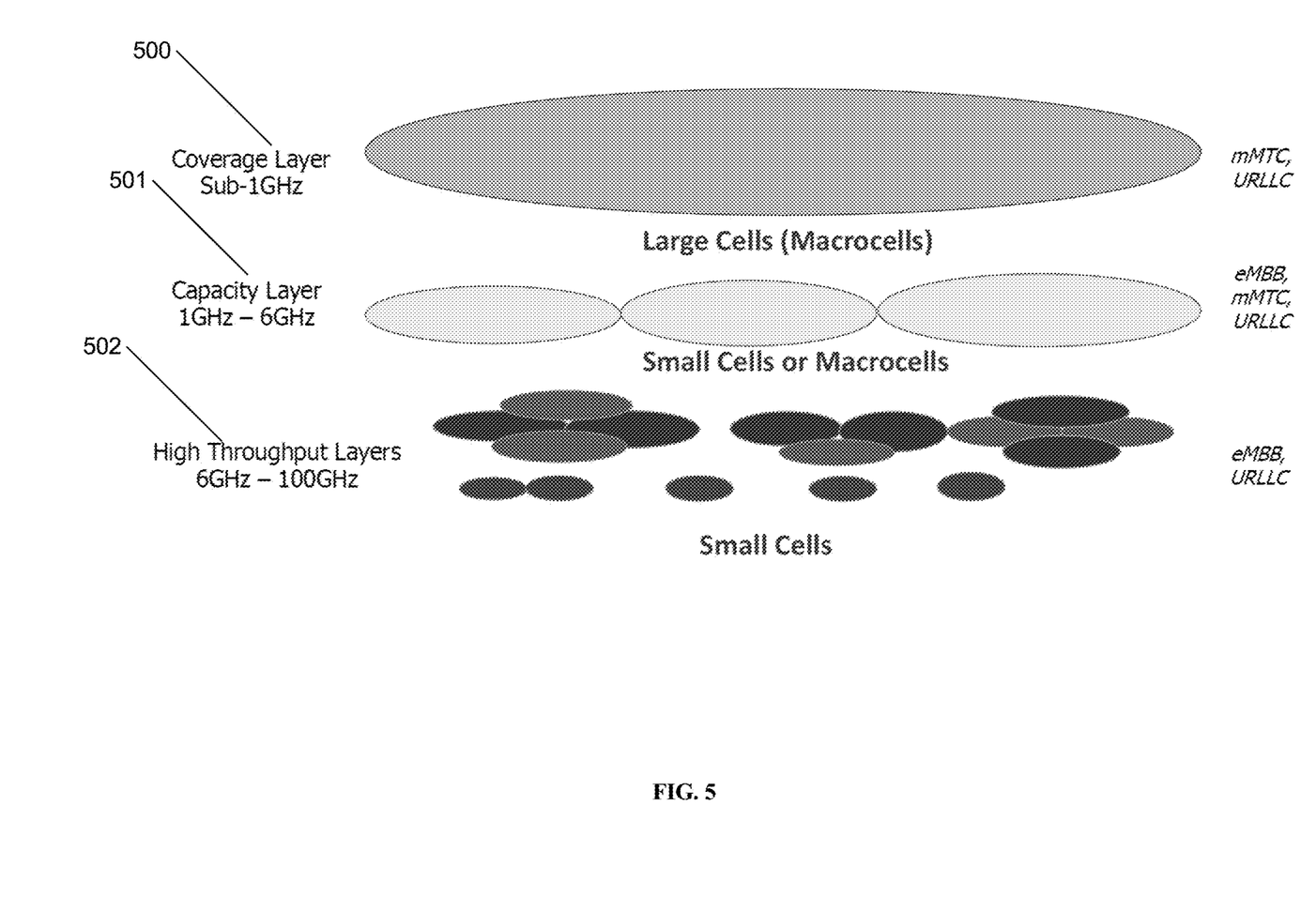
FIG. 5 is a diagram showing a 5G spectrum approach, in accordance with some embodiments.

FIG. 5 shows the 5G spectrum approach. A coverage layer 500 involves large cells at sub-1 Ghz, a capacity layer 501 provides small cells or macrocells at between 1 GHz and 6 GHz and high throughput layers 502 small cells at between 6 GHz an 100 GHz. Using the Parallel Wireless 5G Native Architecture, coverage layer 500 can be provided using other Gs other than 5G, for example, 2G or 4G, and capacity layers 501 can be provided using a variety of Gs as available, and high throughput layers 502 can be provided using other Gs, such as Wi-Fi 5 or Wi-Fi 6. The 5G native architecture has the advantage of also enabling any-haul, which permits the macrocells to use the high-throughput small cells for backhaul in the event that the network topology is able to be configured in that fashion.

Figure 6:
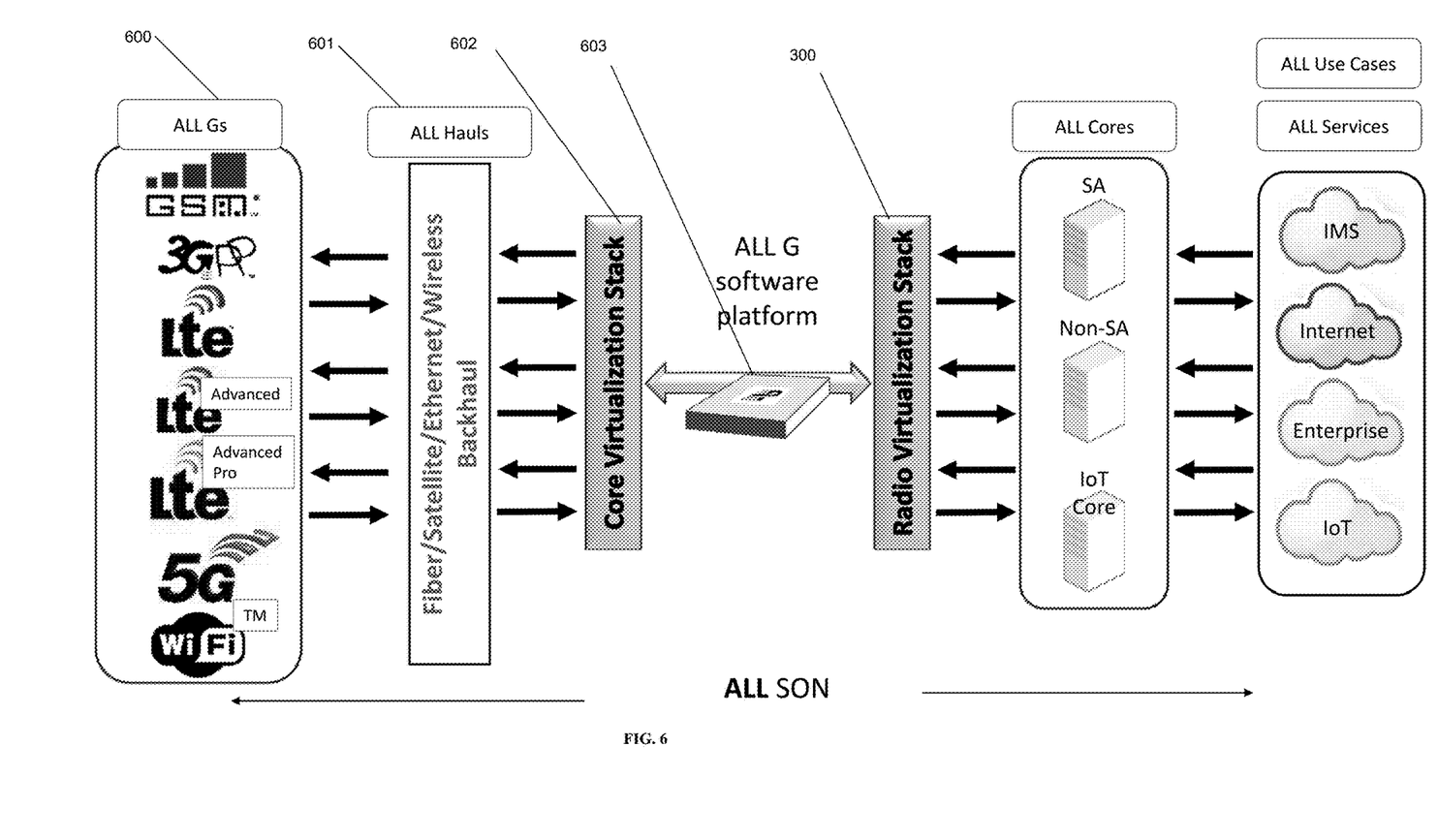
FIG. 6 is a diagram showing 5G-Native architecture, in accordance with some embodiments.

As shown in FIG. 6, the 5G-Native architecture provides All Gs 601, all backhauls 602 (fiber/satellite/Ethernet/wireless backhaul/microwave/drone/etc), a cell virtualization stack 602 with the ALL G software platform 603 and a radio virtualization stack 604 for all cores 605, all use cases 606, and all services 607, as described herein and above. This wide variety of Gs, hauls, and cores also enables this flexible architecture to support multiple services and use cases, such as IMS (voice over IP or VoLTE), Internet use, enterprise use with enhanced security and auditing requirements, or Internet of Things (IoT) uses (particularly for IoT devices using 2G radios for long battery life and low data rate).

Figure 7:
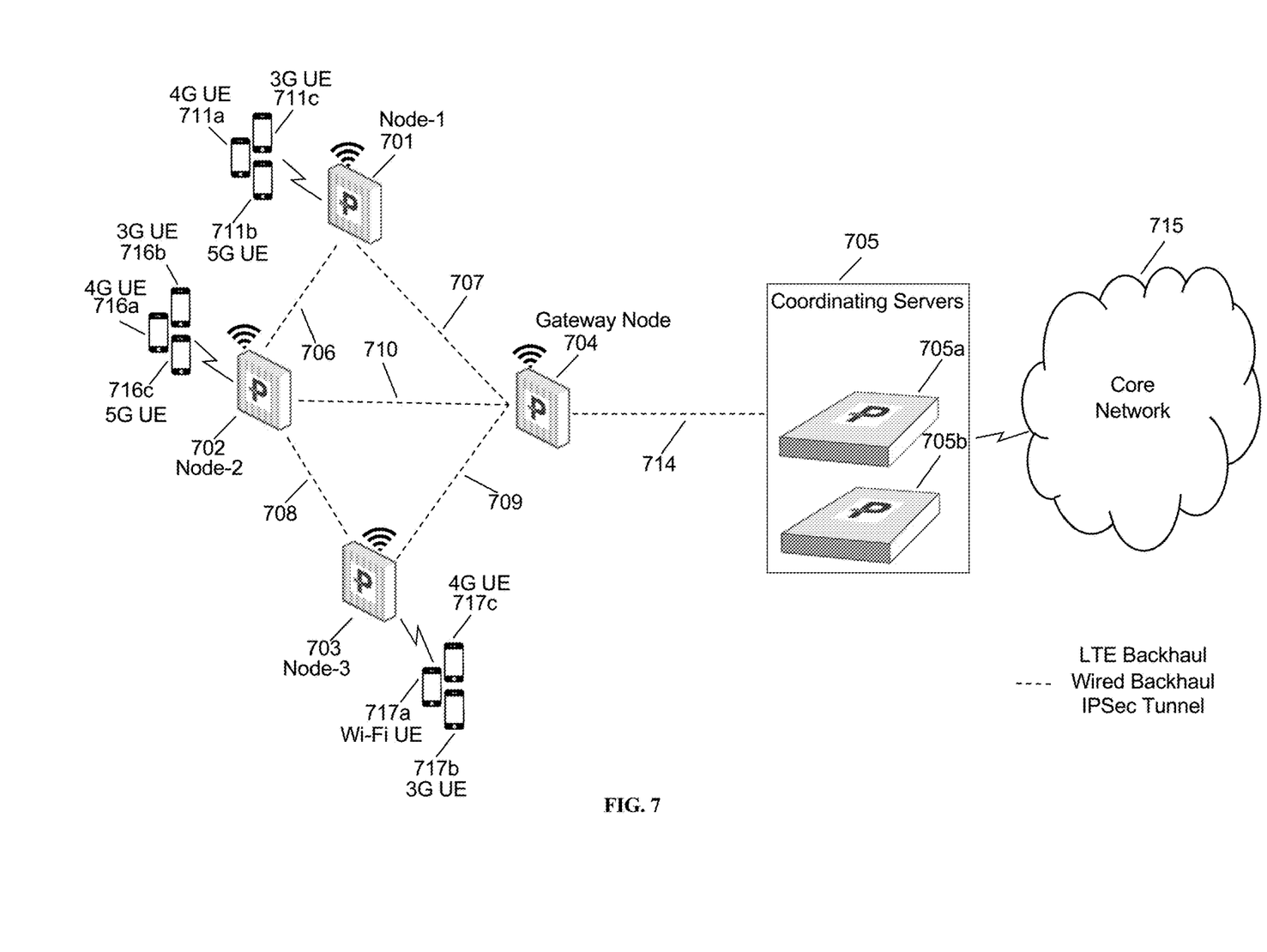
FIG. 7 is a network diagram, in accordance with some embodiments.

FIG. 7 is a network diagram in accordance with some embodiments. In some embodiments, as shown in FIG. 7, a node 1 701, a node 2 702, and a node 3 703 are any G RAN nodes. Base stations 701, 702, and 703 may in some embodiments form a mesh network establishing mesh network links 706, 707, 708, 709, and 710 with a base station 704. The mesh network links are flexible and are used by the mesh nodes to route traffic around congestion within the mesh network as needed. The base station 704 acts as gateway node or mesh gateway node, and provides backhaul connectivity to a core network to the base stations 701, 702, and 703 over backhaul link 714 to a coordinating server(s) 705 and towards core network 715. The Base stations 701, 702, 703, 704 may also provide eNodeB, NodeB, Wi-Fi Access Point, Femto Base Station etc. functionality, and may support radio access technologies such as 2G, 3G, 4G, 5G, Wi-Fi etc. The base stations 701, 702, 703 may also be known as mesh network nodes 701, 702, 703.

The coordinating servers 705 are between the RAN and the core, providing the ALL G abstraction platform described herein, and are shown as two coordinating servers 705a and 705b. The coordinating servers 705a and 705b may be in load-sharing mode or may be in active-standby mode for high availability. The coordinating servers 705 may be located between a radio access network (RAN) and the core network and may appear as core network to the base stations in a radio access network (RAN) and a single eNodeB to the core network, i.e., may provide virtualization of the base stations towards the core network. As shown in FIG. 7, various user equipments 711a, 711b, 711c are connected to the base station 701. The base station 701 provides backhaul connectivity to the user equipments 711a, 711b, and 711c connected to it over mesh network links 706, 707, 708, 709, 710 and 714. The user equipments may be mobile devices, mobile phones, personal digital assistant (PDA), tablet, laptop etc. The base station 702 provides backhaul connection to user equipments 712a, 712b, 712c and the base station 703 provides backhaul connection to user equipments 713a, 713b, and 713c. The user equipments 711a, 711b, 711c, 712a, 712b, 712c, 713a, 713b, 713c may support any radio access technology such as 2G, 3G, 4G, 5G, Wi-Fi, WiMAX, LTE, LTE-Advanced etc. supported by the mesh network base stations, and may interwork these technologies to IP.

In some embodiments, depending on the user activity occurring at the user equipments 711a, 711b, 711c, 712a, 712b, 712c, 713a, 713b, and 713c, the uplink 714 may get congested under certain circumstances. As described above, to continue the radio access network running and providing services to the user equipments, the solution requires prioritizing or classifying the traffic based at the base stations 701, 702, 703. The traffic from the base stations 701, 702, and 703 to the core network 715 through the coordinating server 705 flows through an IPSec tunnel terminated at the coordinating server 705. The mesh network nodes 701, 702, and 703 adds IP Option header field to the outermost IP Header (i.e., not to the pre-encapsulated packets). The traffic may from the base station 701 may follow any of the mesh network link path such as 707, 706-110, 706-108-109 to reach to the mesh gateway node 704, according to a mesh network routing protocol.

Figure 8:
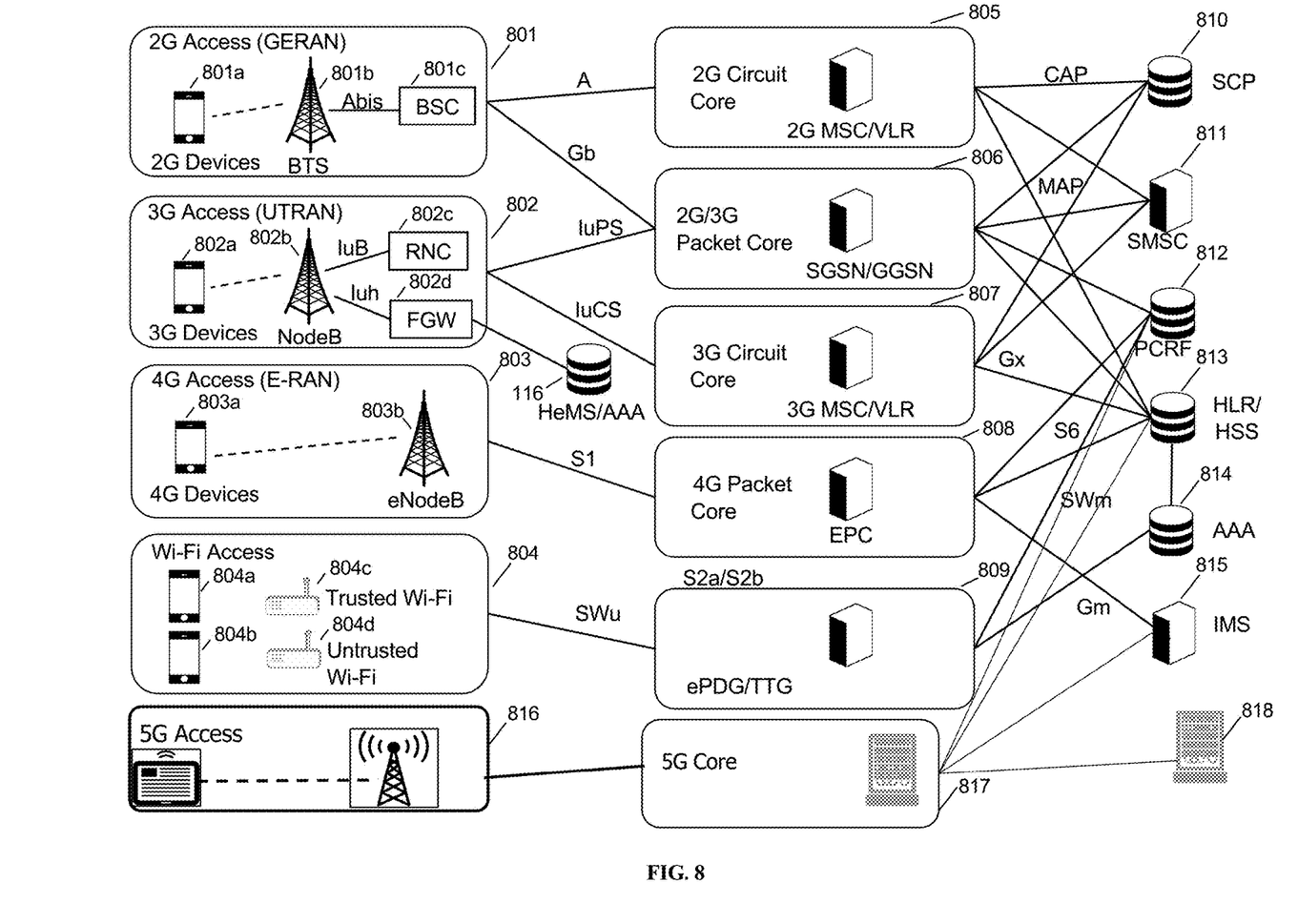
FIG. 8 is a network architecture diagram for 3G and other-G networks, in accordance with some embodiments.

FIG. 8 is a schematic network architecture diagram for 3G and other-G prior art networks. The diagram shows a plurality of "Gs," including 2G, 3G, 4G, 5G and Wi-Fi. 2G is represented by GERAN 801, which includes a 2G device 801a, BTS 801b, and BSC 801c. 3G is represented by UTRAN 802, which includes a 3G UE 802a, nodeB 802b, RNC 802c, and femto gateway (FGW, which in 3GPP namespace is also known as a Home nodeB Gateway or HNBGW) 802d. 4G is represented by EUTRAN or E-RAN 803, which includes an LTE UE 803a and LTE eNodeB 803b. Wi-Fi is represented by Wi-Fi access network 804, which includes a trusted Wi-Fi access point 804c and an untrusted Wi-Fi access point 804d. The Wi-Fi devices 804a and 804b may access either AP 804c or 804d. In the current network architecture, each "G" has a core network. 2G circuit core network 805 includes a 2G MSC/VLR; 2G/3G packet core network 806 includes an SGSN/GGSN (for EDGE or UMTS packet traffic); 3G circuit core 807 includes a 3G MSC/VLR; 4G circuit core 808 includes an evolved packet core (EPC); and in some embodiments the Wi-Fi access network may be connected via an ePDG/TTG using S2a/S2b. Each of these nodes are connected via a number of different protocols and interfaces, as shown, to other, non- "G"-specific network nodes, such as the SCP 830, the SMSC 831, PCRF 832, HLR/HSS 833, Authentication, Authorization, and Accounting server (AAA) 834, and IP Multimedia Subsystem (IMS) 835. An HeMS/AAA 836 is present in some cases for use by the 3G UTRAN. The diagram is used to indicate schematically the basic functions of each network as known to one of skill in the art, and is not intended to be exhaustive. For example, 5G core 817 is shown using a single interface to 5G access 816, although in some cases 5G access can be supported using dual connectivity or via a non-standalone deployment architecture.

Noteworthy is that the RANs 801, 802, 803, 804 and 836 rely on specialized core networks 805, 806, 807, 808, 809, 837 but share essential management databases 830, 831, 832, 833, 834, 835, 838. More specifically, for the 2G GERAN, a BSC 801c is required for Abis compatibility with BTS 801b, while for the 3G UTRAN, an RNC 802c is required for Iub compatibility and an FGW 802d is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

The Parallel Wireless 5G Native Architecture collapses the majority of these items into a single node that hosts these individual core network functions as virtual functions, enabling many of the legacy technology services to be turned off.

Figure 9:
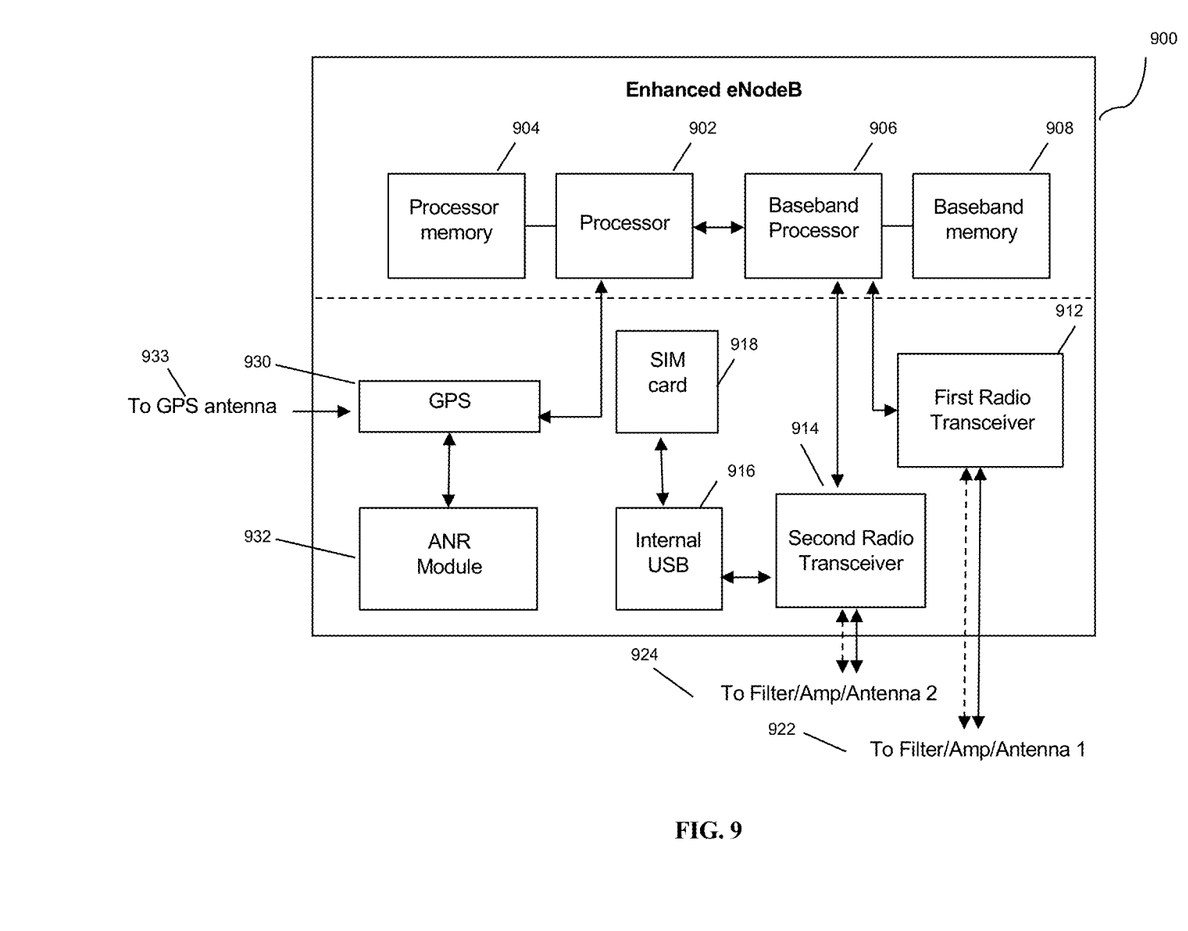
FIG. 9 is a diagram of an enhanced base station, in accordance with some embodiments

FIG. 9 is an enhanced eNodeB/gNodeB/multi-RAT node for performing the methods described herein, in accordance with some embodiments. Network node 900 may include processor 902, processor memory 904 in communication with the processor, baseband processor 906, and baseband processor memory 908 in communication with the baseband processor. Network node 900 may also include first radio transceiver 912 and second radio transceiver 914, internal universal serial bus (USB) port 916, and subscriber information module card (SIM card) 918 coupled to USB port 916. In some embodiments, the second radio transceiver 914 itself may be coupled to USB port 916, and communications from the baseband processor may be passed through USB port 916. The second radio transceiver may be used for wirelessly backhauling eNodeB 900.

Processor 902 and baseband processor 906 are in communication with one another. Processor 902 may perform routing functions, and may determine if/when a switch in network configuration is needed. Baseband processor 906 may generate and receive radio signals for both radio transceivers 912 and 914, based on instructions from processor 902. In some embodiments, processors 902 and 906 may be on the same physical logic board. In other embodiments, they may be on separate logic boards.

Processor 902 may identify the appropriate network configuration, and may perform routing of packets from one network interface to another accordingly. Processor 902 may use memory 904, in particular to store a routing table to be used for routing packets. Baseband processor 906 may perform operations to generate the radio frequency signals for transmission or retransmission by both transceivers 910 and 912. Baseband processor 906 may also perform operations to decode signals received by transceivers 912 and 914. Baseband processor 906 may use memory 908 to perform these tasks.

The first radio transceiver 912 may be a radio transceiver capable of providing LTE eNodeB functionality, and may be capable of higher power and multi-channel OFDMA. The second radio transceiver 914 may be a radio transceiver capable of providing LTE UE functionality. Both transceivers 912 and 914 may be capable of receiving and transmitting on one or more LTE bands. In some embodiments, either or both of transceivers 912 and 914 may be capable of providing both LTE eNodeB and LTE UE functionality. Transceiver 912 may be coupled to processor 902 via a Peripheral Component Interconnect-Express (PCI-E) bus, and/or via a daughtercard. As transceiver 914 is for providing LTE UE functionality, in effect emulating a user equipment, it may be connected via the same or different PCI-E bus, or by a USB bus, and may also be coupled to SIM card 918. First transceiver 912 may be coupled to first radio frequency (RF) chain (filter, amplifier, antenna) 922, and second transceiver 914 may be coupled to second RF chain (filter, amplifier, antenna) 924.

SIM card 918 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 900 is not an ordinary UE but instead is a special UE for providing backhaul to device 900.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 912 and 914, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 902 for reconfiguration.

A GPS module 930 may also be included, and may be in communication with a GPS antenna 932 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 932 may also be present and may run on processor 902 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 10:
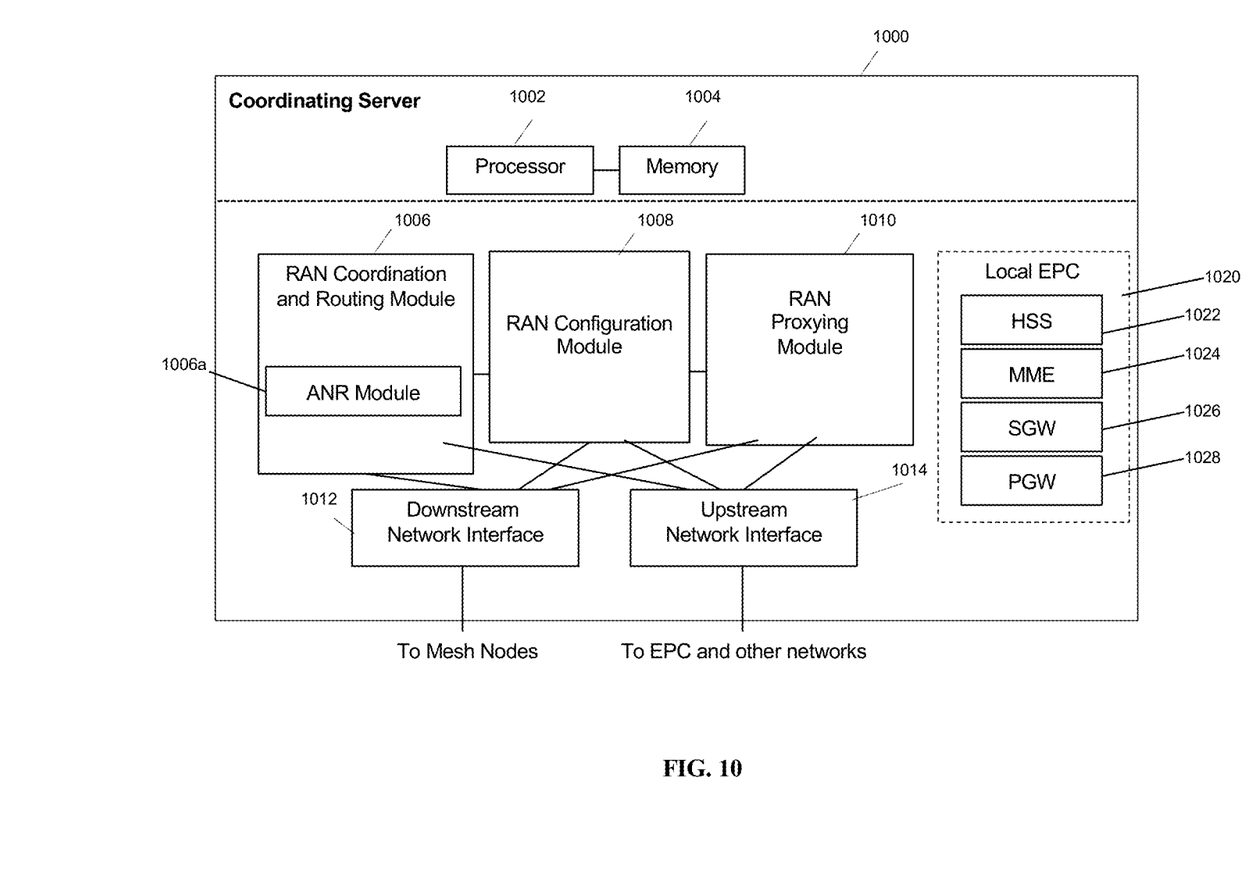
FIG. 10 is a coordinating server for providing services and performing methods as described herein, in accordance with some embodiments.

FIG. 10 is a coordinating server for providing services and performing methods as described herein, in accordance with some embodiments. Coordinating server 1000 includes processor 1002 and memory 1004, which are configured to provide the functions described herein. Also present are radio access network coordination/routing (RAN Coordination and routing) module 1006, including ANR module 1006a, RAN configuration module 1008, and RAN proxying module 1010. The ANR module 1006a may perform the ANR tracking, PCI disambiguation, ECGI requesting, and GPS coalescing and tracking as described herein, in coordination with RAN coordination module 1006 (e.g., for requesting ECGIs, etc.). In some embodiments, coordinating server 1000 may coordinate multiple RANs using coordination module 1006. In some embodiments, coordination server may also provide proxying, routing virtualization and RAN virtualization, via modules 1010 and 1008. In some embodiments, a downstream network interface 1012 is provided for interfacing with the RANs, which may be a radio interface (e.g., LTE), and an upstream network interface 1014 is provided for interfacing with the core network, which may be either a radio interface (e.g., LTE) or a wired interface (e.g., Ethernet). Further virtual network functions can be provided as described elsewhere herein.

Coordinator 1000 includes local evolved packet core (EPC) module 1020, for authenticating users, storing and caching priority profile information, and performing other EPC-dependent functions when no backhaul link is available. Local EPC 1020 may include local HSS 1022, local MME 1024, local SGW 1026, and local PGW 1028, as well as other modules. Local EPC 1020 may incorporate these modules as software modules, processes, or containers. Local EPC 1020 may alternatively incorporate these modules as a small number of monolithic software processes. Modules 1006, 1008, 1010 and local EPC 1020 may each run on processor 1002 or on another processor, or may be located within another device.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof.

The word "cell" is used herein to denote either the coverage area of any base station, or the base station itself, as appropriate and as would be understood by one having skill in the art. For purposes of the present disclosure, while actual PCIs and ECGIs have values that reflect the public land mobile networks (PLMNs) that the base stations are part of, the values are illustrative and do not reflect any PLMNs nor the actual structure of PCI and ECGI values.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, legacy TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A method for providing a 5G native architecture in a cellular network, comprising:
providing an any G software platform located at a coordination node between at least one radio access network (RAN) and at least one core network, including a RAN-facing core virtualization stack capable of communication with a plurality of backhauls and a plurality of any G RANs, and a core-facing radio virtualization stack capable of communication with any cores, wherein the plurality of any G RANs includes at least two of 2G, 3G, 4G, and 5G;
wherein the core virtualization stack communicates with an analytics layer, the analytics layer communicates with an orchestration layer, the orchestration layer communicates with a consolidation layer, and the consolidation layer communicates with the radio virtualization stack, thereby enabling an any G core to communicate with the plurality of any G radio access networks; and
providing, via the any G platform, network slicing to 2G, 3G and 4G networks.

2. The method of claim 1, wherein the orchestration layer includes a software configuration module and a software optimization module.

3. The method of claim 1, wherein the consolidation layer includes at least two of: a vBSC software module, a vRNC software module, an HNB-GW software module, an HeNB-GW software module, an X2-GW software module, a vENB software module, a vEBC software module, 5gc software module, a TWAG software module, and an ePDG software module.

4. The method of claim 1, further comprising providing, via the any G software platform, 5G standalone (SA) service.

5. The cellular network of claim 4, further comprising providing the 5G SA service via one of: SA LTE connected to EPC, SA NR connected to 5GC, and SA LTE connected to 5GC.

6. The method of claim 1, providing, via the any G software platform, 5G non-standalone (NSA) service.

7. The method of claim 6, further comprising providing the 5G NSA service via one of: NSA LTE assisted NR connected to EPC, NSA NR assisted LTE connected to 5GC, and NSA LTE assisted NR connected to 5GC.

8. The method of claim 1, wherein the all G software platform provides network slicing across all Gs and across the cellular network as a whole.

9. A system providing a 5G native architecture, comprising:
an any G software platform, including a core virtualization stack capable of communication with all hauls, and a radio virtualization stack capable of communication with any cores and wherein the core virtualization stack communicates with an analytics layer, the analytics layer communicates with an orchestration layer, the orchestration layer communicates with a consolidation layer, and the consolidation layer communicates with the radio virtualization stack such that any G core is able to communicate with any G radio access network, wherein any G includes at least two of 2G, 3G, 4G and 5G; and
providing, via the any G platform, network slicing to 2G, 3G and 4G networks.

10. The system of claim 9, wherein the orchestration layer incldues a software configuration module and a software optimization module.

11. The system of claim 9, wherein the consolidation layer includes at least two of: a vBSC software module, a vRNC software module, an HNB-GW software module, an HeNB-GW software module, an X2-GW software module, a vENB software module, a vEBC software module, 5gc software module, a TWAG software module, and an ePDG software module.

12. The system of claim 9, wherein the all G software platform provides 5G standalone (SA) service.

13. The system of claim 12, wherein the 5G SA service comprises one of SA LTE connected to EPC, SA NR connected to 5GC, and SA LTE connected to 5GC.

14. The system of claim 9, further comprising the any G software platform providing 5G non-standalone (NSA) service.

15. The system of claim 14, wherein the 5G NSA service comprises one of: NSA LTE assisted NR connected to EPC, NSA NR assisted LTE connected to 5GC, and NSA LTE assisted NR connected to 5GC.

16. The system of claim 14, wherein the any G software platform provides network slicing across any Gs and across an operator network.

17. A non-transitory computer-readable medium containing instructions for providing an any G software platform which, when executed, cause a system to perform steps comprising:
providing an any G software platform, including a RAN-facing core virtualization stack capable of communication with a plurality of backhauls and a plurality of any G RANs, and a core-facing radio virtualization stack capable of communication with any cores, wherein the plurality of any G RANs includes at least two of 2G, 3G, 4G and 5G; and
wherein the core virtualization stack communicates with an analytics layer, the analytics layer communicates with an orchestration layer, the orchestration layer communicates with a consolidation layer, and the consolidation layer communicates with the radio virtualization stack, thereby enabling an any G core to communicate with the plurality of any G radio access networks; and
providing, via the any G platform, network slicing to 2G, 3G and 4G networks.

18. The non-transitory computer-readable medium of claim 17, further comprising instructions wherein the any G software platform provides 5G standalone (SA) service.

19. The non-transitory computer-readable medium of claim 17, further comprising instructions wherein the any G software platform provides 5G non-standalone (NSA) service.

20. The non-transitory computer-readable medium of claim 17, further comprising instructions wherein the any G software platform provides network slicing across any Gs and across an entire cellular network.

\* \* \* \* \*